Dec. 16, 1941.   M. W. THOMPSON   2,266,288
FLUSHING APPARATUS
Filed Dec. 4, 1939
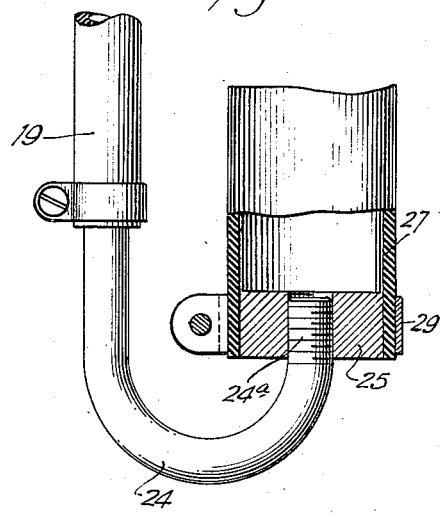
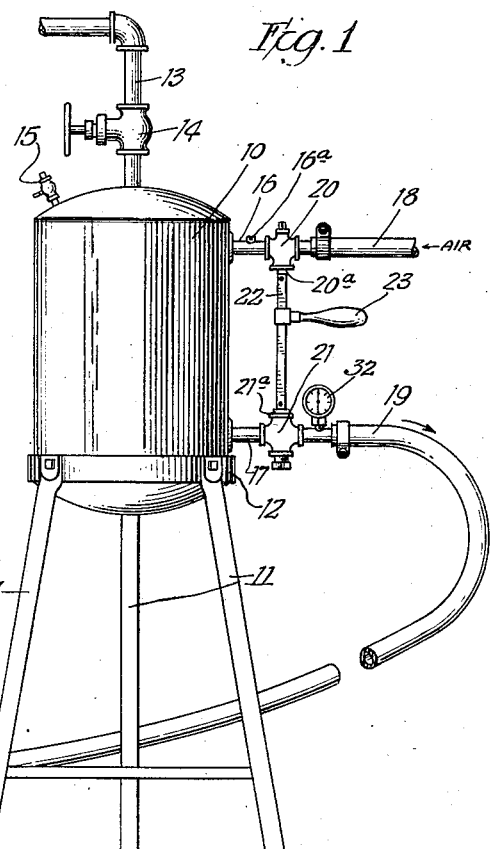
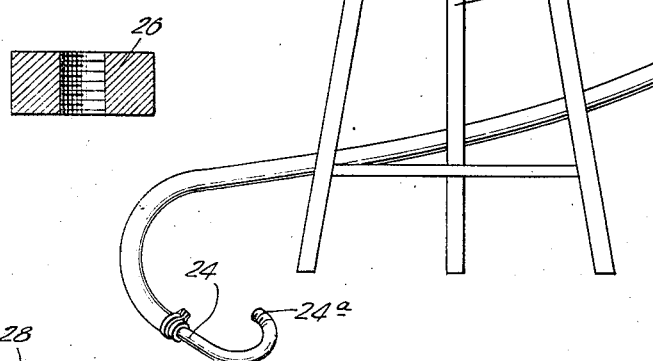
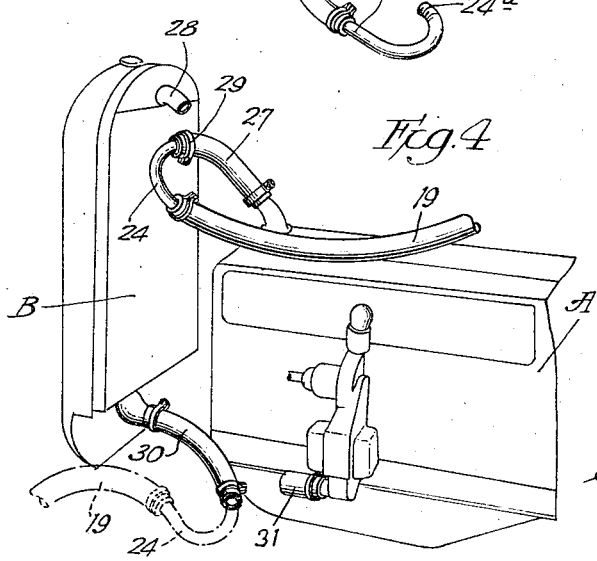
Inventor:
Martin W. Thompson
By:
Sheridan, Davis & Cargill
Attys.

Patented Dec. 16, 1941

2,266,288

UNITED STATES PATENT OFFICE 2,266,288

FLUSHING APPARATUS

Martin W. Thompson, Hammond, Ind.

Application December 4, 1939, Serial No. 307,480

1 Claim. (Cl. 141—1)

This invention relates to improvements in flushing apparatus.

One object of the invention is to provide an improved apparatus for use in flushing out the rust, sediment and other foreign matters from the water circulating passage of internal combustion engines and from engine radiators or for other purposes.

Another object of the invention is to provide flushing apparatus provided with means for subjecting the flushing fluid, such as water or water containing any suitable detergent, solvent or the like, to adequate pressure for the purpose of imparting sufficient velocity to the fluid to assure of a scouring action not only to effect the dislodgment of encrustations and deposits on the surfaces to be cleaned, but which velocity is adequate to retain such dislodged particles and sediment in a state of suspension whereby they will be carried out of such passages by the flushing fluid.

Another object of the invention is to provide flushing apparatus provided with means whereby the flushing fluid is forced into and through the passages to be cleaned by means of air under pressure, the volume of air employed being variable by the operator simultaneously with the variations by him of the rate of flow of the fluid from the apparatus whereby the use of excessive air pressure is avoided and the likelihood of damage to the apparatus or to the equipment being cleaned, such as an automobile radiator, is avoided.

Other objects of the invention relate to various features of construction and arrangements of parts which will be apparent from a consideration of the following specification and accompanying drawing, wherein Figure 1 is a side elevation of a flushing apparatus embodying the present improvement;

Figure 2 is an enlarged broken view of a delivery hose of the tank illustrating an adapter carried thereby;

Figure 3 is a detached view of a hose adapter of a size different from that shown in Figure 2; and Figure 4 is a broken perspective view of an automobile engine and radiator illustrating the mode of use of the apparatus shown in Figure 1 in flushing out the engine cylinder block and the radiator.

In the accompanying drawing the numeral 10 indicates a tank of suitable capacity which preferably is provided with a supporting stand which in the form illustrated comprises three legs 11 connected to a band 12 encircling the base of the tank and suitably secured thereto by welding or by other approved means. The tank, which may be of about ten gallons capacity, where the apparatus is used for flushing out automobile engine blocks or radiators, is preferably provided with an inlet conduit 13 through which the flushing fluid is admitted, the fluid being water or any other suitable flushing preparation or preparations. The pipe 13 is provided with a valve 14 which may be closed to prevent the escape of air during the flushing operation. To facilitate filling the tank with the fluid a vent member in the form of a petcock 15 is provided at the upper end of the tank.

At one side of the tank it is provided with two nipples 16 and 17, the upper nipple 16 constituting an intake for compressed air which may be supplied through a pipe or a hose 18 from a suitable source of supply. The lower nipple 17 constitutes an outlet for the flushing fluid and is shown as being connected to a hose 19.

Interposed in the nipples 16 and 17 are valves 20 and 21, respectively, the former for controlling the flow of air into the tank and the latter for regulating the flow of flushing fluid from the tank. Where the pressure of the air at its source is relatively high, the air carrying capacity of valve 20 is considerably less than the fluid carrying capacity of valve 21 inasmuch as the air is utilized only for forcing the liquid from the tank at a velocity that will provide a scouring action for loosening encrustations, sediment or other foreign matter in the passages to be cleaned and will be effective in sustaining such loosened material in suspension in the liquid and so cause the material to be carried from such passage with the overflowing fluid. To avoid subjecting the tank inadvertently to the relatively high pressures generally prevailing in the sources of supply, such as the conventional air pressure systems employed in service stations for supplying air to tire inflating air lines, the operating stem 20a of valve 20 is connected by a member 22 to the operating stem 21a of valve 21 whereby when a handle 23 connected to member 22 is operated both valves are opened or closed concurrently and to a relatively like extent. By this arrangement the operator can not accidentally admit air into the tank without opening valve 21. Hence the tank is never subjected to the maximum pressure of the air line and the tank need not be of such strength as would otherwise be required.

The hose 19 at its lower end is provided with a connector member 24 shown as in the form of a pipe of J-shape provided with a threaded end 24a. An adapter 25 shown in Figure 2 is adapted to be screwed on the end 24a of the connector 24. Figure 3 shows a similar adapter 26 of smaller diameter for fitting within a hose of smaller diameter than the hose shown in Figure 2. In using the apparatus illustrated in flushing out the water circulating passage of an engine block A and a radiator B of an engine, the conventional hose 27 which connects the radiator with the engine is disconnected from the radiator hose connector member 28 after loosening the hose clamp 29, while the hose section 30, which connects the lower part of the radiator with the engine, is disconnected from the engine or from the hose connector member 31. A proper size adaptor 25 or 26 is attached to the member 24 and the adaptor then inserted in the hose 27 and the hose clamp 29 is tightened around the end of the hose and the adaptor to provide a fluid-tight connection. Flushing fluid is admitted to the tank 10 from a suitable source of supply by opening the valve 14 and thereafter closing the same. The control handle or lever 23 is then operated to open valves 20 and 21, thus admitting air under pressure into the tank which forces the fluid from the tank through hose 19 into hose 27 and thence through the engine water-circulatory passages and out through the member 31 from which the end of hose 30 has been detached. The pressure of the air preferably is such as to impart sufficient velocity to the flushing fluid so that it effectually loosens sediment and other foreign matter from the passage and removes it therefrom. If desired, additional tanks of fluid, such as water, may similarly be forced through the engine-circulatory passages.

In some instances where the circulating passages are in such condition as to require it, they are preferably subjected for a suitable time to the action of a solution containing an agent adapted to soften or disintegrate the foreign matter before the passages are flushed with the improved apparatus.

In flushing out the radiator of the engine, the coupling member 24 is attached to the hose 30 in the manner described above with reference to hose 27 and as illustrated in Figure 4 and the flushing fluid forced upwardly through the radiator tubes, whence it overflows through the hose connecting member 28.

I have found that there is little or no likelihood of damaging clogged or partially clogged radiators with the present apparatus inasmuch as the operator can nicely control the flow of both air and fluid to the radiator by means of the handle or valve control member 23 and the presence or absence of overflowing fluid gives an indication of the condition of the radiator. If the flushing fluid overflows freely the operator can safely manipulate the handle to provide a more vigorous flow and consequently a more effective flushing or scouring action, while if little or no overflow occurs it is an indication of partially or wholly clogged radiator tubes. I have found that where the pressure of the air at the source is in the neighborhood of 150 pounds, if the maximum opening in valve 20 is about one-quarter inch in diameter and the opening of valve 21 about three-quarters inch in diameter satisfactory results are obtained. If desired, the nipple 16 may be provided with a screw plug 16a, as shown in Figure 1, whereby the air-carrying capacity of the nipple can be further reduced and less air allowed to enter the tank in proportion to the liquid-carrying capacity of the valve 21 when the latter is fully opened.

Since the capacities of radiators vary in different models and makes of cars, and since a partially clogged radiator will have less fluid carrying capacity than one which is not in such condition, a gage 32 may be mounted on the nipple 17 as shown in Figure 1 for registering the pressure of the fluid passing through the hose and consequently into the radiator. If the radiator is clogged or partially clogged, or if the radiator is of relatively small capacity, the hand of the indicator will show greater pressure and consequently the operator, to avoid possible damage to the radiator tubes, will swing the handle 23 in a valve closing direction.

By means of the present improvements, an operator can readily and thoroughly flush the sediment from engine blocks, engine radiators and other passages where he has suitable air pressure available, as is common in automobile service stations for example. The water pressure prevailing in ordinary city or village mains is not sufficient generally to provide the velocity required in satisfactorily dislodging and removing sediment and other foreign matters that frequently accumulate in automobile cooling systems, and hence the provision of means adapted to utilize the available air pressure lines of service stations as an easily regulatable source of pressure renders the present apparatus not only relatively inexpensive but one which is very effective for the purposes mentioned.

While I have shown and described an embodiment of the invention for the purpose of illustration, I do not wish to be restricted specifically thereto as various modifications in the apparatus may be resorted to without departing from the spirit of the invention.

I claim:

In a flushing apparatus for water circulating passages of internal combustion engines and the like, comprising a tank provided with a liquid intake passage, a manually operable valve in said passage for opening and closing the same, a liquid outlet passage for said tank and including a hose having an adaptor for detachable connection with the water circulating passage to be flushed, a valve in said outlet passage for controlling the passage of liquid therethrough from said tank, said tank also having an air inlet passage for air under pressure, a valve in said air inlet passage for controlling the passage of air to said tank, manually operable control means directly connecting the valves in said air inlet and liquid outlet passages for simultaneous operation thereof, and manually adjustable valve means in said air inlet passage and associated with said last mentioned control means for varying the passage of air to and liquid from said tank upon actuation of said control means.

MARTIN W. THOMPSON.